May 9, 1933. J. E. FOWLER Re. 18,827

OIL BURNER

Original Filed May 19, 1930 4 Sheets-Sheet 1

Inventor

Joseph E. Fowler

By Owen W. Kennedy

Attorney

May 9, 1933. J. E. FOWLER Re. 18,827

OIL BURNER

Original Filed May 19, 1930 4 Sheets-Sheet 2

Inventor

Joseph E. Fowler

By Owen W. Kennedy

Attorney

May 9, 1933. J. E. FOWLER Re. 18,827

OIL BURNER

Original Filed May 19, 1930 4 Sheets-Sheet 3

Inventor
Joseph E. Fowler
By Owen W. Kennedy
Attorney

May 9, 1933. J. E. FOWLER Re. 18,827

OIL BURNER

Original Filed May 19, 1930 4 Sheets-Sheet 4

Inventor

Joseph E. Fowler

By Owen U. Kennedy

Attorney

Reissued May 9, 1933 Re. 18,827

UNITED STATES PATENT OFFICE

JOSEPH E. FOWLER, OF WORCESTER, MASSACHUSETTS

OIL BURNER

Original No. 1,878,836, dated September 20, 1932, Serial No. 453,776, filed May 19, 1930. Application for reissue filed January 11, 1933. Serial No. 651,239.

This invention relates to oil burners and is an improvement upon the burner disclosed in Patent No. 1,633,753, granted to me March 27, 1928. Like the burner disclosed in the patent referred to, the present invention is primarily intended for use in stoves and furnaces, although adapted for many other uses.

An object of the present invention is the provision of an oil burner including a wide open top oil cup, or chamber, located beneath the combustion chambers and air chambers, with means to admit air into the air chambers from the sides of the burner to preheat the air before it enters the combustion chambers, and thus promote combustion and increase the heat of the flame.

Another object of the invention is the provision of means for so mounting and supporting the cylinder walls of the air and combustion chambers as to provide a structure which may be removed and replaced as a unit, and when in position, will eliminate leakage of air into the combustion chambers.

Another object of the invention is the provision of an oil cup for supplying fuel to a plurality of combustion chambers to conserve space and thus adapt the burner for use in ranges, where a small burner of great heating capacity is necessary.

Another object of the invention is the provision of an oil burner wherein a single valve is employed for controlling the fuel to a plurality of combustion chambers.

With the above and other objects in view, the invention further includes the following novel features and details of construction, to be hereinafter more fully described, illustrated in the accompanying drawings and pointed out in the appended claims.

Figure 1:
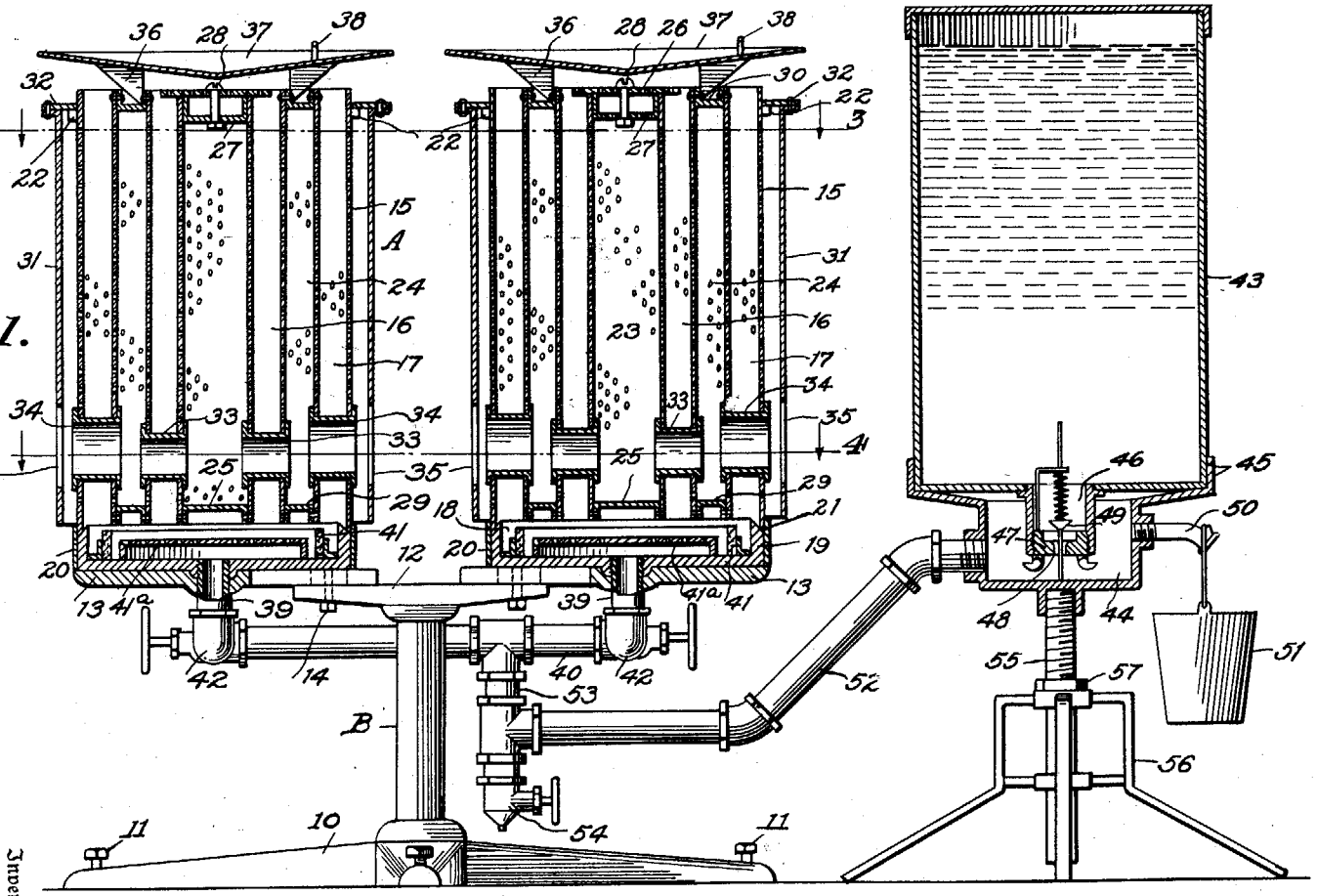
Figure 1 is a vertical sectional view partly in elevation showing a burner constructed in accordance with the invention.
Figure 2:
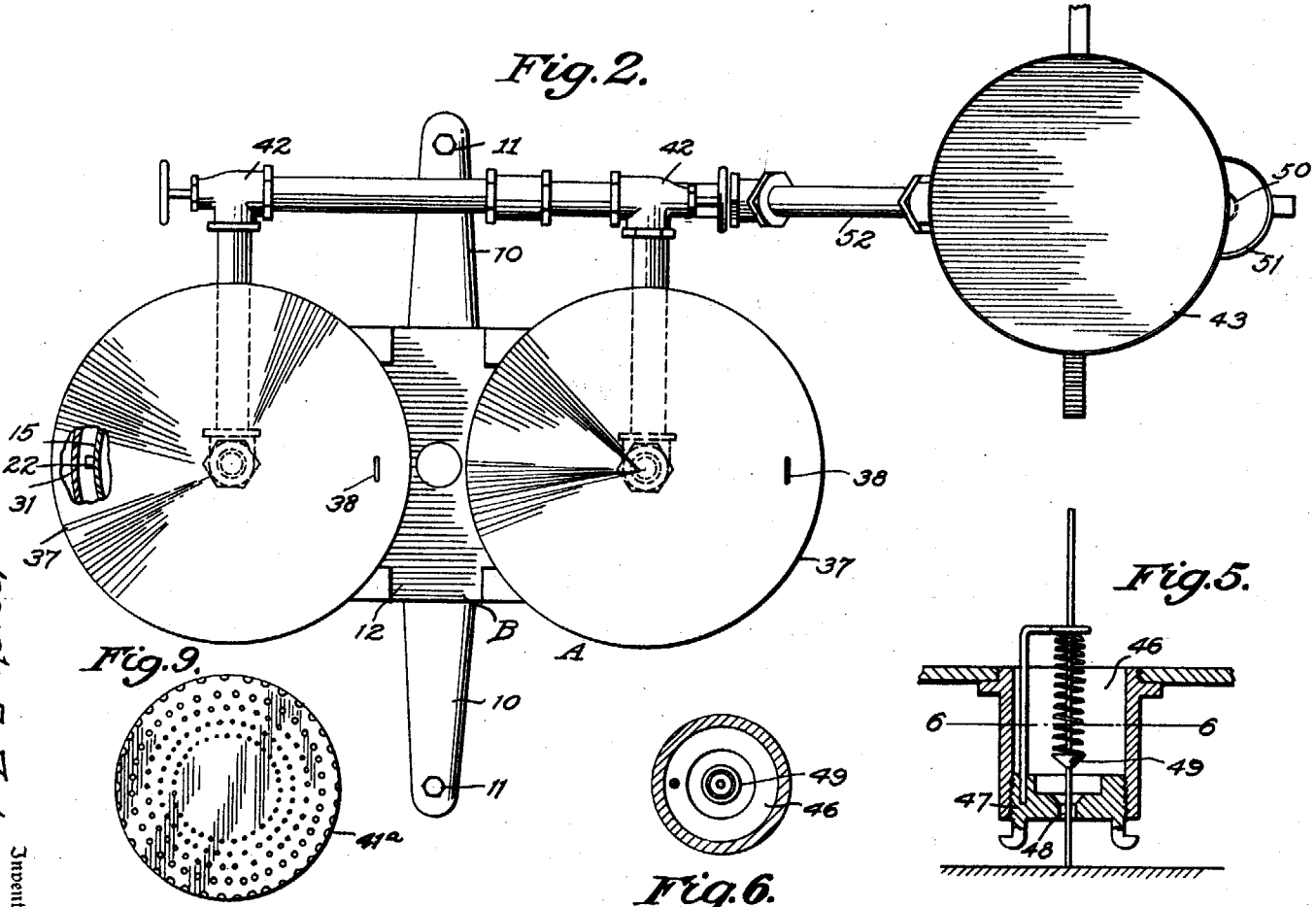
Figure 2 is a top plan view of the same.
Figure 3:
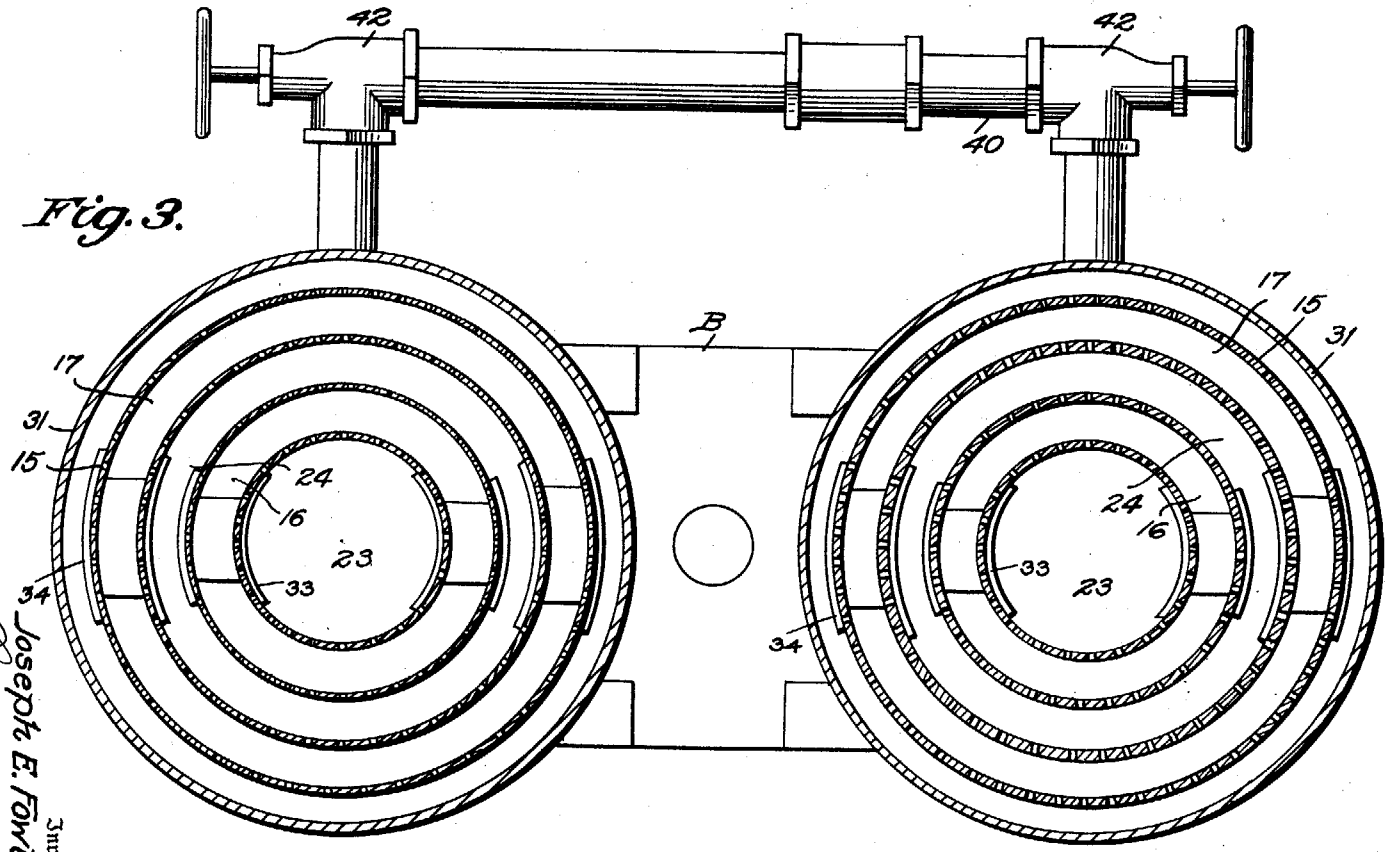
Figures 4, 7, 8:
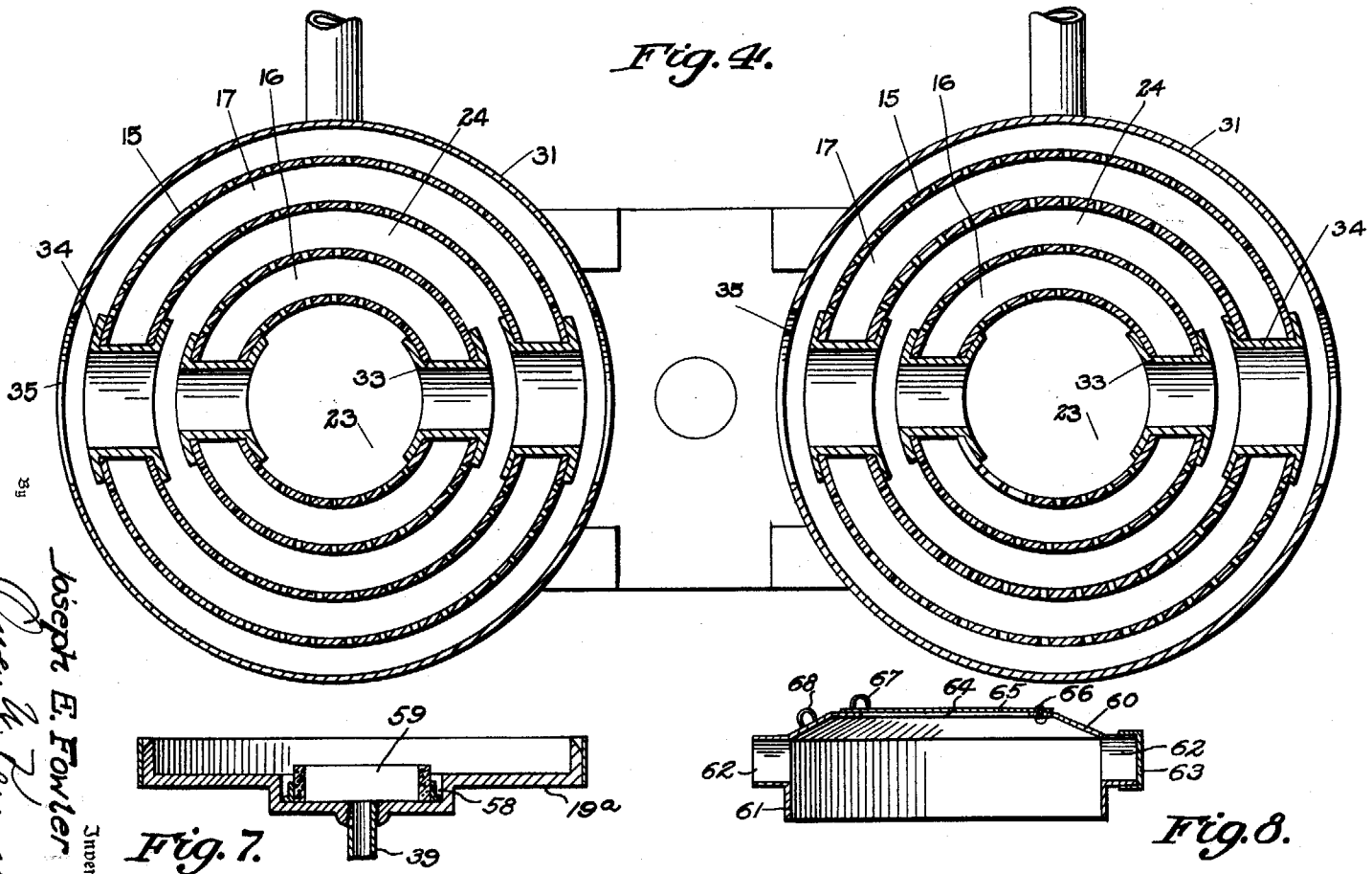

Figures 3 and 4 are enlarged sectional views taken respectively on the lines 3—3 and 4—4 of Figure 1.

Figure 5 is an enlarged fragmentary sectional view illustrating the outlet valve for the oil tank.

Figure 6 is a section on the line 6—6 of Figure 5.

Figure 7 is a detail sectional view illustrating a modified form of oil cup.

Figure 8 is a detail sectional view showing a modified form of flame distributor.

Figure 9 is a detail plan view of the flame disc.

Referring to the drawings in detail wherein like characters of reference denote corresponding parts, the reference character A indicates a burner unit, two of which are shown as supported upon a stand B. This stand includes a base having legs 10 which carry at their outer ends adjusting screws 11, by means of which the top 12 of the stand may be adjusted. The burner units A are mounted upon supporting cradles 13 which are adjustably secured to the top 12 as shown at 14. The burner units may thus be relatively adjusted.

Each of the burner units A includes a plurality of spaced perforated cylinders 15. These cylinders are so arranged and spaced as to provide inner and outer combustion chambers 16 and 17, respectively, whose lower ends are open for communication with an oil chamber 18 provided in an open cup 19, the latter being mounted upon the cradle 13. The open edge of this cup is beveled and is surrounded by a ring 20 so as to provide an annular seat 21 for the lower edge of the outermost perforated cylinder 15.

In addition to the combustion chambers 16 and 17, the perforated cylinders provide an inner air chamber 23 and an intermediate air chamber 24, the latter being located between the combustion chambers 16 and 17. The air chamber 23 is closed at its bottom, as indicated at 25, by a flanged disc secured to the lower end of the innermost cylinder 15, while the top of this air chamber has extending thereacross a disc 26. This disc is attached to a cuplike member 27 by means of a screw 28 and extends over into the adjacent combustion chamber 16. The air chamber 24 is also closed at its bottom, as shown at 29, by a flanged ring secured to the lower ends of the intermediate cylinders 15, and its upper end is provided with a similar ring closure 30.

In addition to the cylinder 15, the burner includes an outer cylinder 31 which is supported from the outer cylinder 15 through the medium of lugs 22. The space between the cylinder 31 and the adjacent perforated cylinder is closed at its top by an annulus 32. The walls of the combustion chambers 16 and 17 are connected by conduits or thimbles 33 and 34, the latter providing the air passage from the atmosphere into the air chamber 24, while the conduit or thimble 33 provides for the passage of air into the inner air chamber 23.

As the rings 29 and 30 and the conduits 33 and 34 connect the cylinders 15, and as the cylinder 31 is supported upon lugs 22 which extend from the outermost cylinder 15, this last mentioned cylinder acts to support the remaining cylinders as a unit, on the seat 21 around the outer wall of the cup 19, with the lower ends of the other cylinders 15 above the cup bottom. Openings 35 are provided in the outer cylinder 31 in alignment in the passages referred to so that air will be admitted through the sides of the burner to the air chambers 23 and 24. The cylinder 31 is imperforate, except for the openings 35.

Supported upon the top of the burner as indicated at 36 is a flame distributor or spreader 37. A loop or staple 38 extends from this flame distributor for engagement by a suitable tool or implement for the removal of the distributor.

Oil is admitted to the oil chamber through a pipe 39 which extends from a manifold 40, and a lighting ring or wick 41 is positioned within the oil chamber. This ring is preferably formed of asbestos and is used to initially heat the burner. A single valve 42 controls the admission of oil to the oil chamber and as this chamber supplies fuel to a plurality of combustion chambers, this valve controls both of the combustion chambers.

As the air conduits are positioned above the oil cup, and as the structure of this cup prevents the passage of air therethrough, the temperature of the cup will not be lowered by unheated air passing into the oil chamber within this cup.

Located within the oil chamber upon the inside of the ring 41 is an inverted perforated pan-like member 41*a* which defines a strainer disc. The flange of this member spaces the perforated disc above the bottom of the oil chamber, so that the vapor will burn above the perforations of this disc and the flame will be prevented from contact with the oil. This disc acts to evenly distribute the vapor to the flame and prevents the formation of carbon.

The reference character 43 indicates an oil reservoir or tank which is removably mounted upon the top of an oil well 44, the latter having extending therefrom flanges 45 to retain the tank. This tank is provided with a discharge mouth 46 having a flush plug 47 threadedly secured therein. The plug is provided with a discharge opening 48 which is controlled by a spring pressed valve 49. An overflow pipe 50 extends from the well and has depending therefrom a bucket or receptacle 51. A pipe 52 extends from the well 44 to the manifold 40, connection between the pipe 52 and the manifold being effected by means of a short pipe 53. This last referred to pipe is provided with a drain valve 54.

The well 44 is vertically adjustable so as to regulate the level of the oil within the oil chamber 18. For this purpose the well 44 is mounted upon a threaded stem 55 which is adjustable within a stand 56, a nut 57 serving as a means of adjustment.

In Figure 7 of the drawings there is illustrated a slightly different form of oil cup 19*a*. This cup is provided with a central depression 58 which receives the oil ring 59. Oil collects in the depression 58, instead of flowing over the entire surface of a large cup, so that the oil vaporizes in the central depression and passes to the combustion chambers. Oil is supplied to the cup through the pipe 39 as previously explained and the cylinders are supported upon the cup after the manner shown in Figure 1.

In Figure 8 there is provided a flame distributor 60 which is rotatably mounted upon the top of the burner by the portion 61 engaging the annulus 32. This distributor is provided with oppositely disposed flame outlets 62, one of which may be provided with a closure 63 if desired. The flame distributor 60 is also provided with a central opening 64 which may be closed by a disc 65 which is pivotally mounted as shown at 66. The disc closure is provided with a loop or staple 67 for convenience in manipulating the closure and the flame distributor is provided with a similar loop or staple 68.

With the form of flame distributor just described, the flame may be directed horizontally in any direction to more effectually heat a hot water front, or a coil in a range. In addition, the flame may be directed upward through the opening 64 for heating cooking utensils upon the top of a stove.

The invention is susceptible of various changes in its form, proportions and minor details of construction, to be hereinafter more fully described, illustrated in the accompanying drawings and pointed out in the appended claims.

Having described the invention what is claimed is:—

1. An oil burner comprising a plurality of perforated cylinders arranged one within another to provide inner and outer combustion chambers and inner and intermediate air chambers, an outer cylinder surrounding the perforated cylinders and inperforate except for oppositely disposed openings, tubes extending through certain of the perforated cylinders and in alignment with said first mentioned openings to admit air to said air chambers, closures secured to the perforated cylinders for closing the upper and lower ends of the air chambers and fuel supply means supporting one of the perforated cylinders, the other cylinders being supported by the last mentioned perforated cylinder.

2. An oil burner comprising a plurality of perforated cylinders arranged one within another to provide inner and outer combustion chambers and inner and intermediate air chambers, an outer cylinder surrounding the perforated cylinders and imperforate except for oppositely disposed openings, tubes extending through certain of the perforated cylinders and in alignment with said first mentioned openings to admit air to said air chambers, closures secured to the perforated cylinders for closing the upper and lower ends of the air chambers, and an open cup shaped fuel supply member supporting one of the perforated cylinders, the other cylinders being supported by the last mentioned perforated cylinder.

3. A liquid fuel burner comprising a plurality of spaced perforated sleeves arranged to provide alternate combustion chambers and air chambers, end closures for said air chambers extending between the ends of certain of said sleeves, conduits extending through said combustion chambers for admitting air to said air chambers, and a fuel supply member for supporting one of said sleeves, the other sleeves being supported from the last named sleeve by said end closures and said conduits.

4. A liquid fuel burner comprising a plurality of spaced perforated sleeves arranged to provide alternate combustion chambers and air chambers, end closures for said air chambers secured to the ends of certain of said sleeves, conduits extending through said combustion chambers for admitting air to said air chambers, and an open cup shaped fuel supply member having an outer wall for supporting the outermost sleeve, the other sleeves being supported from said outermost sleeve by said end closures and said air conduits and the lower open ends of said combustion chambers being spaced above the base of said fuel supply member.

5. A liquid fuel burner comprising a plurality of spaced perforated cylinders concentrically arranged to provide inner and outer combustion chambers and inner and intermediate air chambers, end closures for said air chambers secured to the ends of certain of said cylinders, conduits extending through said combustion chambers for admitting air to said air chambers, and an open cup shaped fuel supply member having an outer circular wall for supporting the outermost cylinder, the other cylinders being supported from said outermost cylinder by said end closures and said air conduits.

6. In a liquid fuel burner, a unit assembly comprising a plurality of perforated sleeves arranged in spaced relation to provide a plurality of chambers therebetween, members extending between the walls of certain of said sleeves for closing the ends of alternate chambers and conduits extending between the walls of other sleeves to admit air to the chambers having the end closures, the chambers through which said conduits pass being open at their ends.

7. In a liquid fuel burner, a plurality of perforated sleeves arranged in spaced relation to provide a plurality of chambers therebetween, members secured to the walls of certain of said sleeves for closing the ends of alternate chambers and conduits secured to and extending between the walls of other sleeves to admit air to the chambers having the end closures, the chambers through which said conduits pass being open at their ends for the passage of products of combustion, said end closures and said conduits serving to secure all of said sleeves together to provide a unit assembly.

JOSEPH E. FOWLER.